United States Patent
Peterson

[11] 3,779,636
[45] Dec. 18, 1973

[54] SLIDE PROJECTOR
[75] Inventor: Dean McCormack Peterson, Littleton, Colo.
[73] Assignee: Honeywell Inc., Minneapolis, Minn.
[22] Filed: Aug. 14, 1970
[21] Appl. No.: 63,741

[52] U.S. Cl. .................................... 353/83, 353/93
[51] Int. Cl. ............................................. G03b 23/16
[58] Field of Search .................. 353/21, 22, 82, 83, 353/86, 85, 90, 93

[56] References Cited
UNITED STATES PATENTS

| | | | |
|---|---|---|---|
| 3,514,198 | 5/1970 | Schacht | 353/21 |
| 1,141,885 | 6/1915 | Palmer | 353/83 |
| 3,218,920 | 11/1965 | Johnson | 353/83 |
| 2,031,361 | 2/1936 | Bowen | 352/133 |

*Primary Examiner*—Louis R. Prince
*Assistant Examiner*—A. J. Mirabito
*Attorney*—Arthur H. Swanson, Lockwood D. Burton and John Shaw Stevenson

[57] ABSTRACT

A projector comprised of 1. a unitary optical system, 2. a means for providing a first and a second light beam each having a separate axes that extends along a common plane and through a different one of two optical objects, 3. a movable first and second light beam directing mirrors jointly coacting simultaneously to replace by infusion a projected image of one of said optical objects that is being projected onto a show screen with the projected image of the other optical object, 4. a connection between the means that moves the light beam directing means and a preview unit of the projector to move the axis of a lens of this preview unit a distance equal to the thickness of one of the mirrors to enable a light image of the non projected one of the two optical objects to be precisely directed by the light beam directing means onto a screen of the preview unit and 5. the employment of the movement of the light beam directing means to replace by infusion the projected image of optical objects that are to be projected onto the preview screen.

5 Claims, 15 Drawing Figures

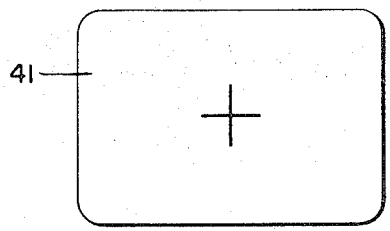
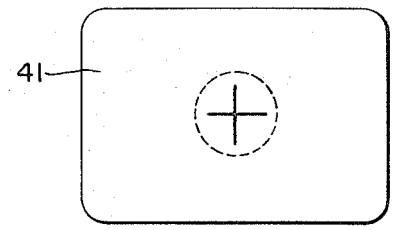
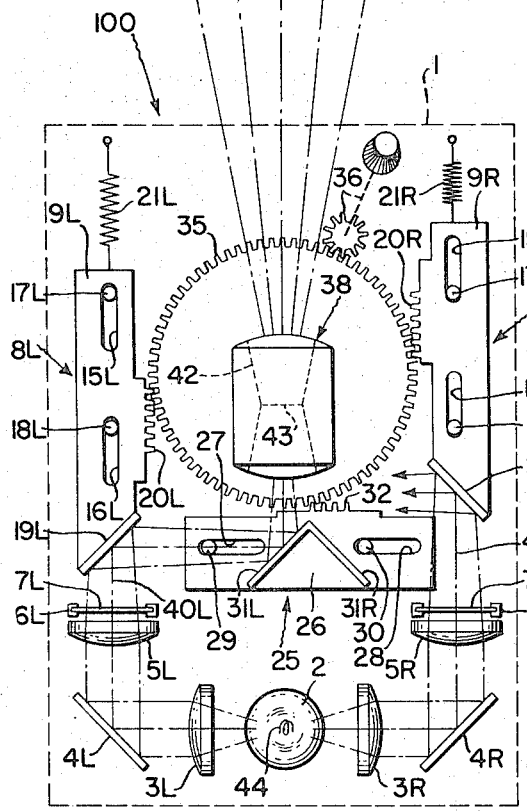
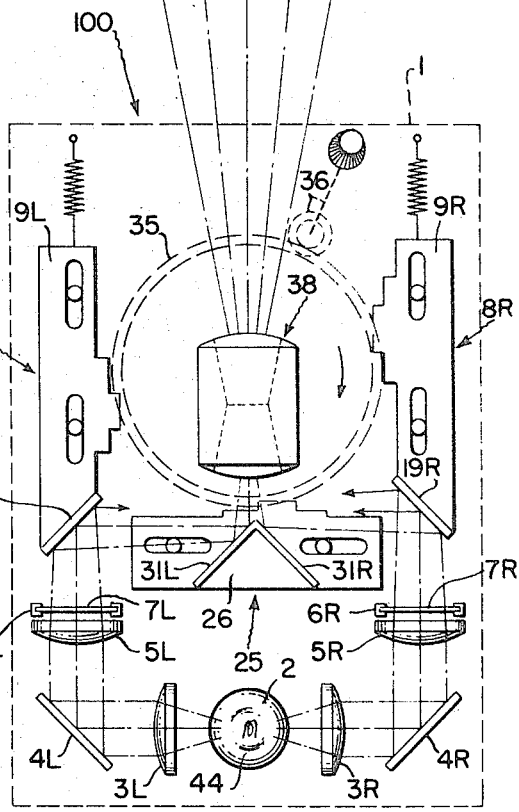
FIG. 1   FIG. 2
INVENTOR.
DEAN McCORMACK PETERSON
BY
John Shaw Stevenson
AGENT.

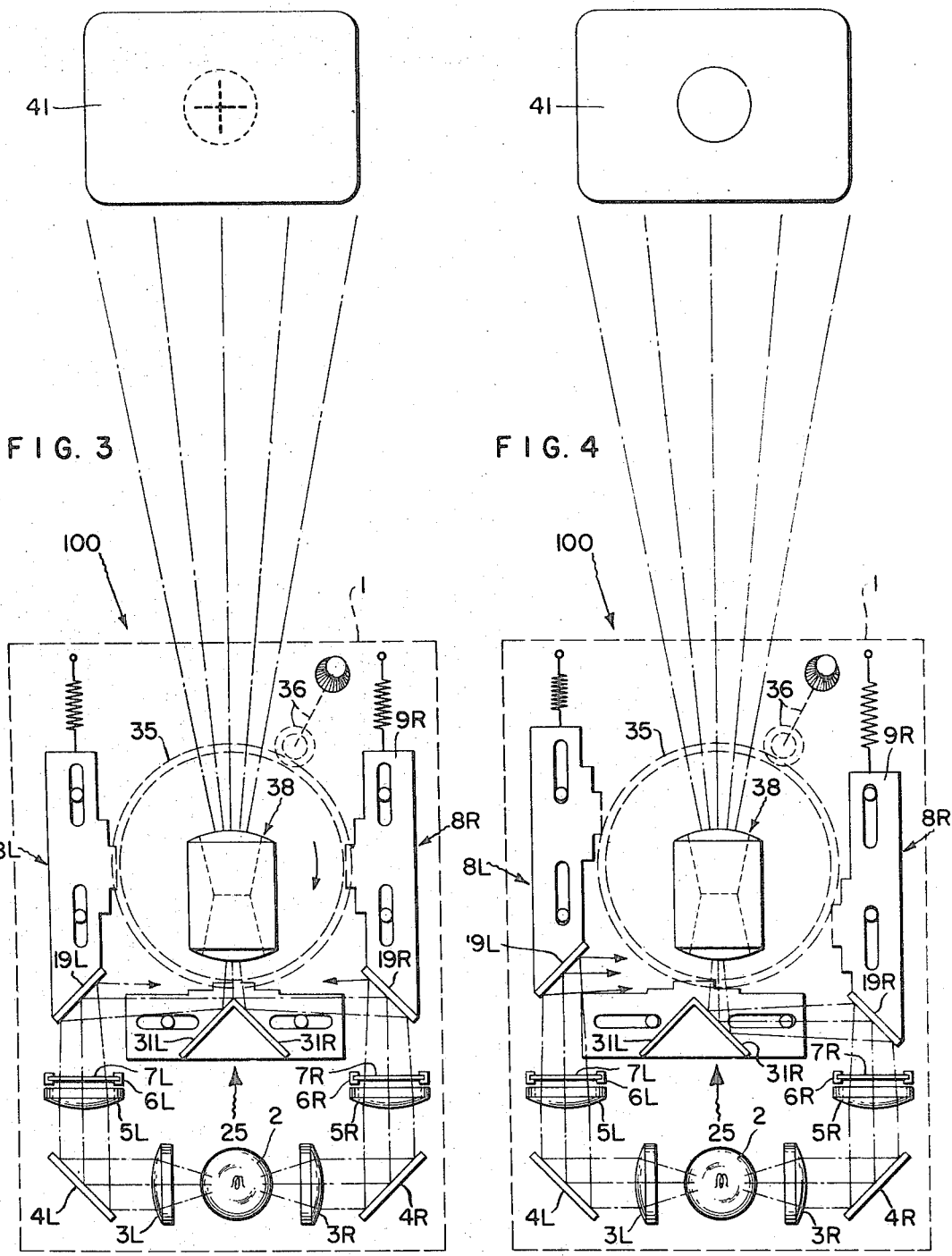

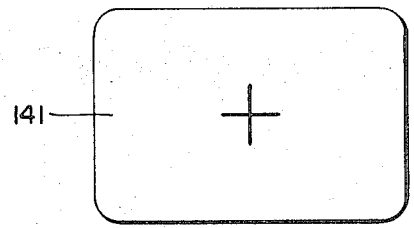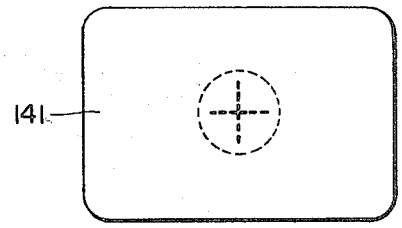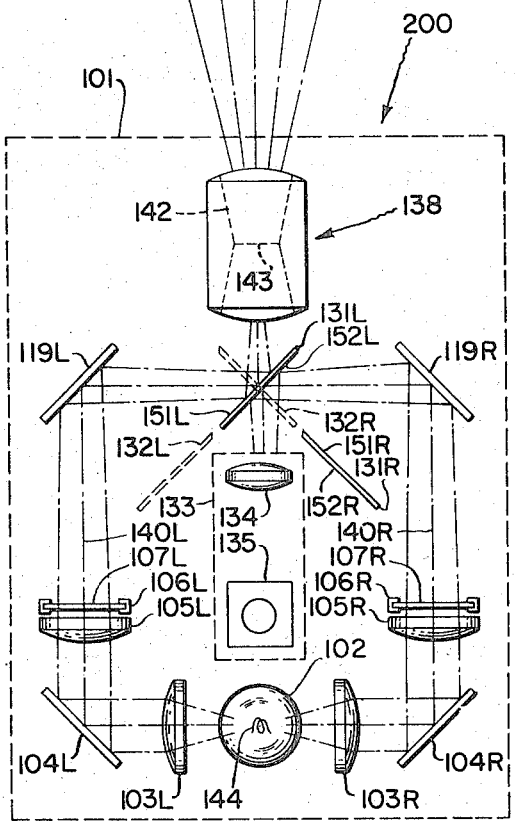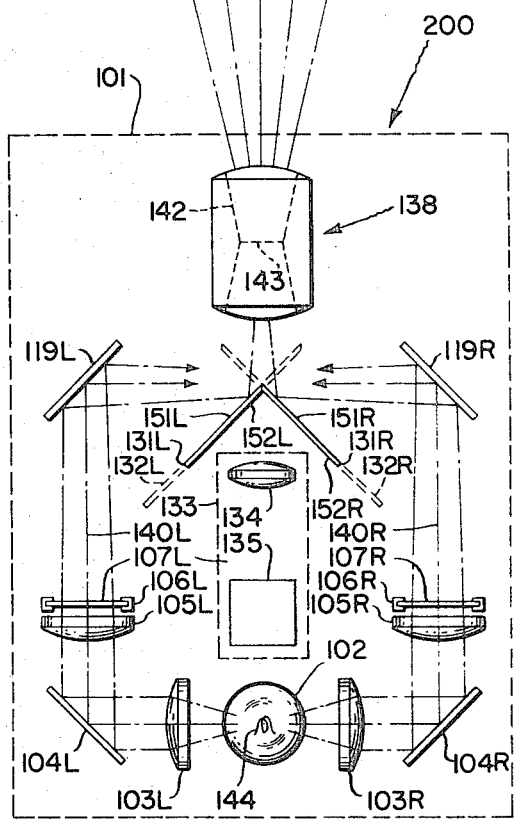

INVENTOR.
DEAN McCORMACK PETERSON
BY
John Shaw Stevenson
AGENT.

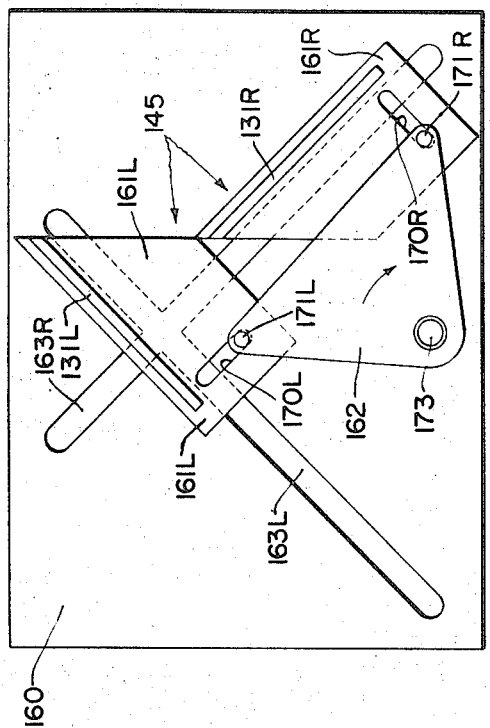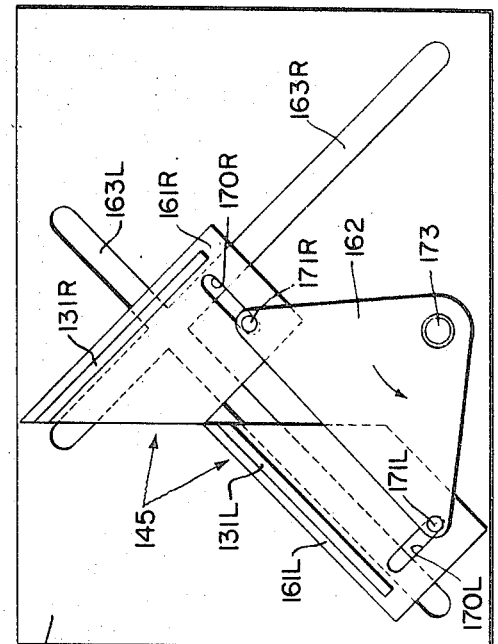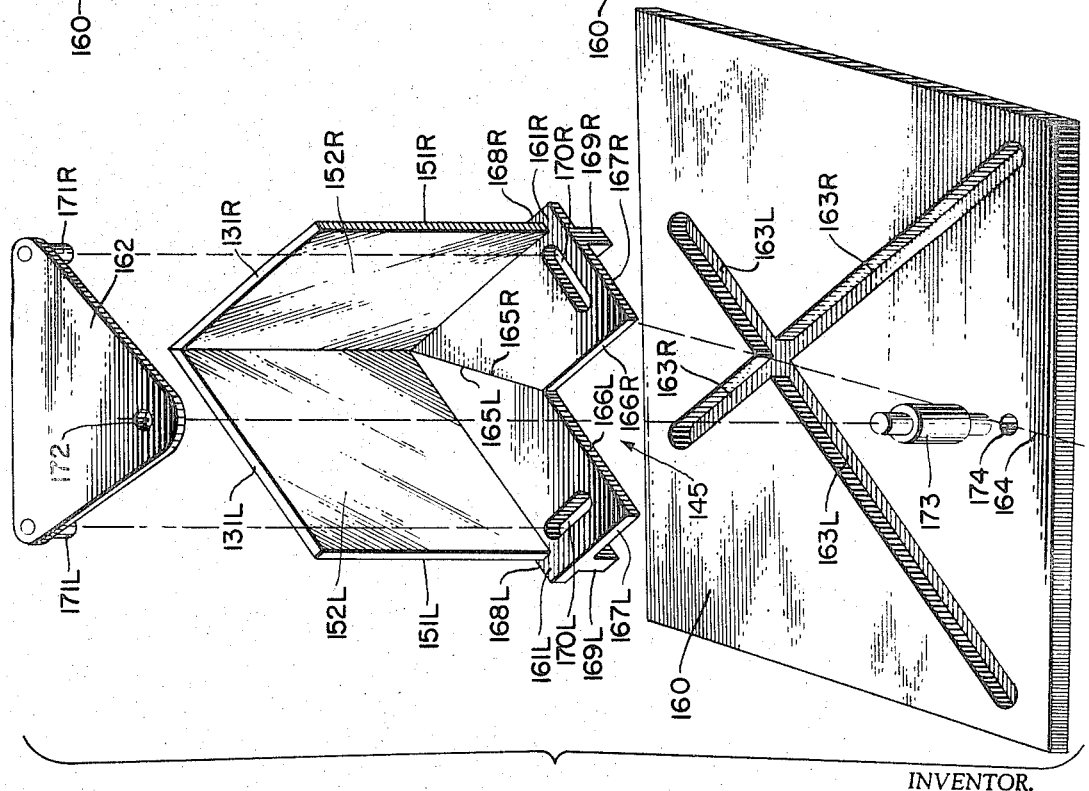

PATENTED DEC 18 1973

INVENTOR.
DEAN McCORMACK PETERSON
BY
John Shaw Stevenson
AGENT.

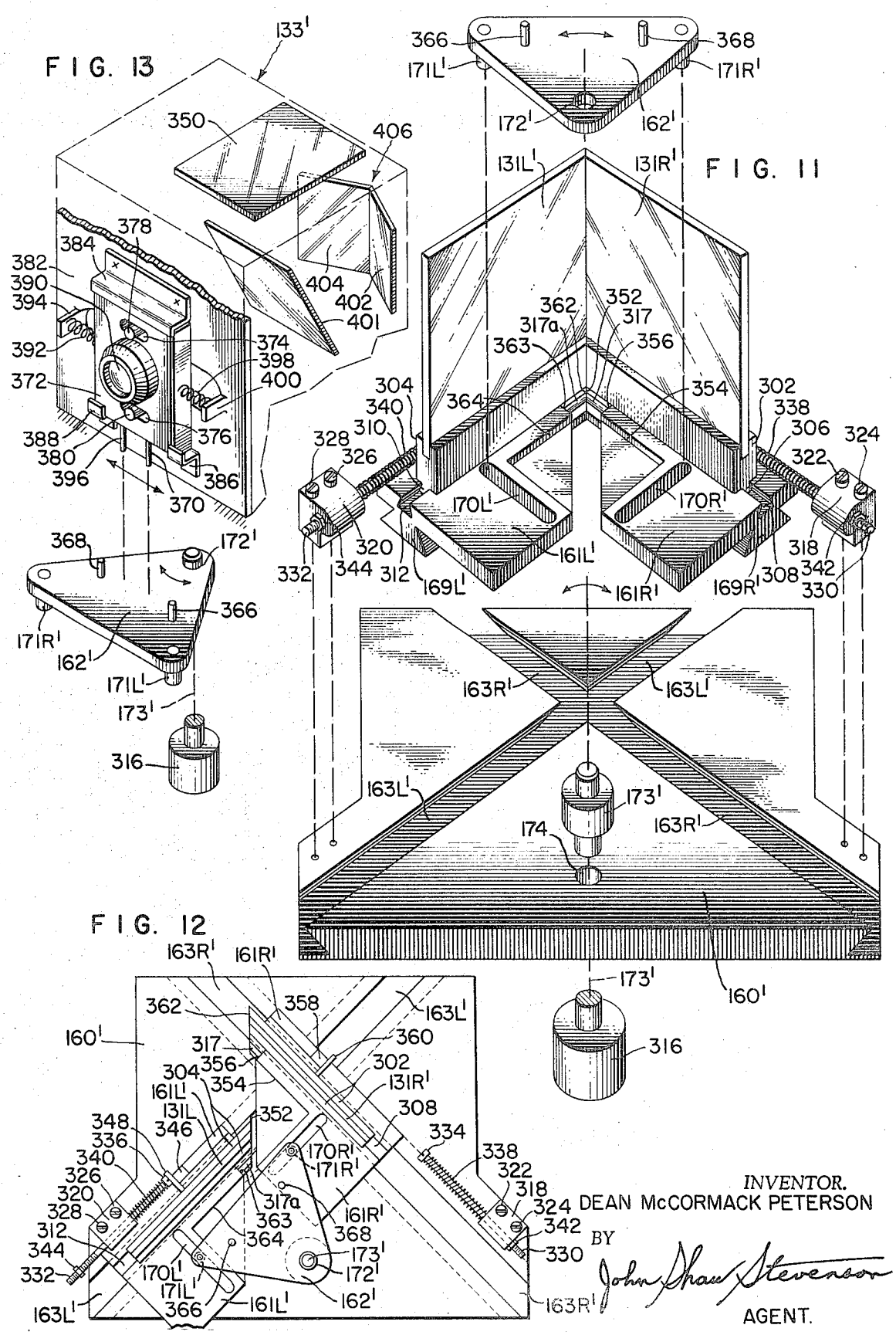

SLIDE PROJECTOR

The present invention relates to projectors that are selectively operable to project the image of one or the other of two photographic slides on a viewing screen and to provide a unique transition by infusion from the projection of the one photographic slide to the other.

Heretofore, slide projectors have been developed which are capable of producing a wipe, or line lap, transition from one photographic slide to another. In one form of slide projector of this type, a line lap transition is accomplished by providing shutters to alternately cut the light at the film planes of one or the other of two photographic slides. The line lap type of projector has its short comings because a person viewing the screen can become distracted because he must repetitiously observe a distinct dividing line moving across a viewing screen each time the image of one photographic slide is replaced by another on a viewing screen.

Other lap dissolve type projectors use two separate slide projectors, in which the intensity of the light source of one slide projector is decreased while the light source of an adjacent slide projector is simultaneously illuminated and then increases in intensity. Alternately, lap dissolve has been accomplished by using a two projector arrangement to simultaneously close off the light aperture of one slide projector while opening the light aperture of the other slide projector. An obvious disadvantage with these prior arrangements for producing lap dissolve is that the intensity changes that take place in the projected image are distracting to the viewer and they are unduly complicated and expensive since they require two slide projectors along with apparatus for simultaneously controlling each of the slide projectors.

It is therefore an object of the present invention to provide a novel slide projector capable of producing a transition from one photographic slide to another by infusion that will continuously maintain the projected image at the same intensity and which will therefore not introduce any of the aforementioned undesired distracting features to the viewer in going from one photographic slide to another.

It is another object to provide a projector that is easier to operate and less expensive to manufacture than other presently available projectors.

It is further an object of the present invention to provide a novel slide projector as set forth which incorporates novel light directing means for accomplishing a transition by infusion from one of the previously mentioned projected slides to the other.

It is also an object of the present invention to provide a novel modified form of the aforementioned slide projector which includes means for successively previewing slides by infusing the slide to be previewed with slide that is being removed from its preview position.

More specifically it is another object of the present invention to provide the aforementioned unique slide preview unit with a lens that is operably connected for movement with the means employed to move the previously mentioned mirrors. In this manner it is possible to alter the position of the preview lens so that any shift in image alignment due to the thickness of each of the optical image transmitting mirrors will be eliminated.

It is another object of the present invention to provide a unique slide projector which is capable of selectively projecting the image of a photographic slide on a viewing screen and removing it therefore while an image of another slide is employed to replace the first slide by infusion or in other words by a process in which the image of the second slide completely replaces the overall surface occupied by the first image as the latter is being removed.

It is, additionally, an object of the present invention to provide novel light directing means which defines an unobstructed constant length light path.

In accomplishing these and other objects, there has been provided in accordance with the present invention a slide projector having a light source means. First and second condensing lens systems are included for forming first and second light beams from light radiating from the light source means. First and second slide receiving compartments forming gates are included for supporting first and second optical objects such as photographic slides in the respective paths of the first and second light beams. First and second movable mirror means having beveled edges are provided for selectively directing light from the first and second slides, respectively, to a projecting lens system. Each movable mirror means selectively defines an unobstructed constant length light path between the respective slide compartment and the projecting lens system. Positioning means are also included for simultaneously positioning the first and second movable mirror means, thereby to produce a unique infusion type of transition during the projection of one slide to the other. Previewing means are, in addition, provided for previewing the next slide to be projected.

It is a further object of the present invention to provide a modified form of the aforementioned first and second mirrors wherein these mirrors are constructed so that they are slidably mounted for movement in their associated movable mirror means and wherein a spring, drive pins and stop means are associated with these mirrors in order to prevent loss of energy during the initial stage of infusion or in other words during the instant of time when one image projecting mirror is being moved out of its show screen picture projecting position and the other mirror is simultaneously being moved into its show screen picture projecting position.

It is another object of the present invention to provide a slide projector of an unusually compact thin line construction by providing first and second light beams that are 1. directed along separate axis that pass through a common plane and 2. by providing movable mirrors that form light beam directing means whose axis are also retained in this same common plane and 3. by providing an optical projecting system whose axis is in the same common plane as the first and second light beams so that these beams can then be transmitted to a show screen.

A better understanding of the invention may be had from the following detailed description when read in connection with the accompanying drawings in which:

FIGS. 1–4 are top views of a first embodiment of a slide projector according to the present invention;

FIGS. 5–7 are top views of a second embodiment of a slide projector according to the present invention;

Figure 7:
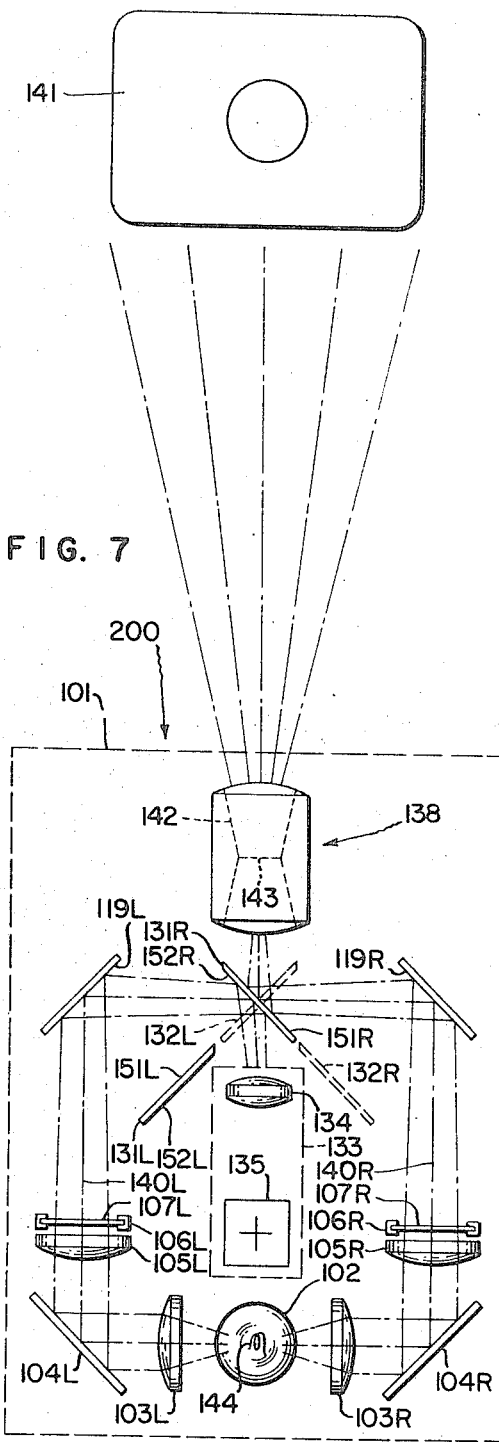
Figure 9:
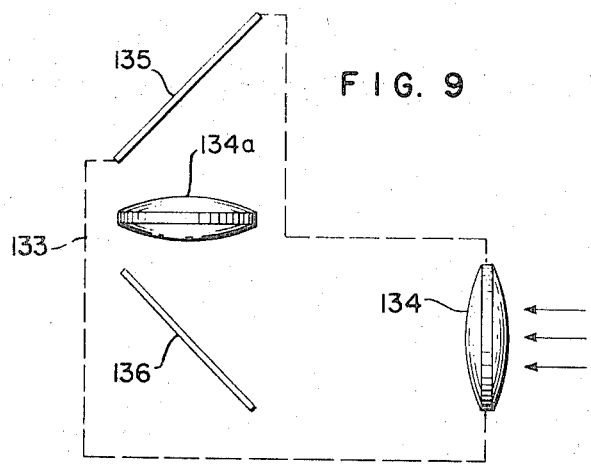
Figure 10:
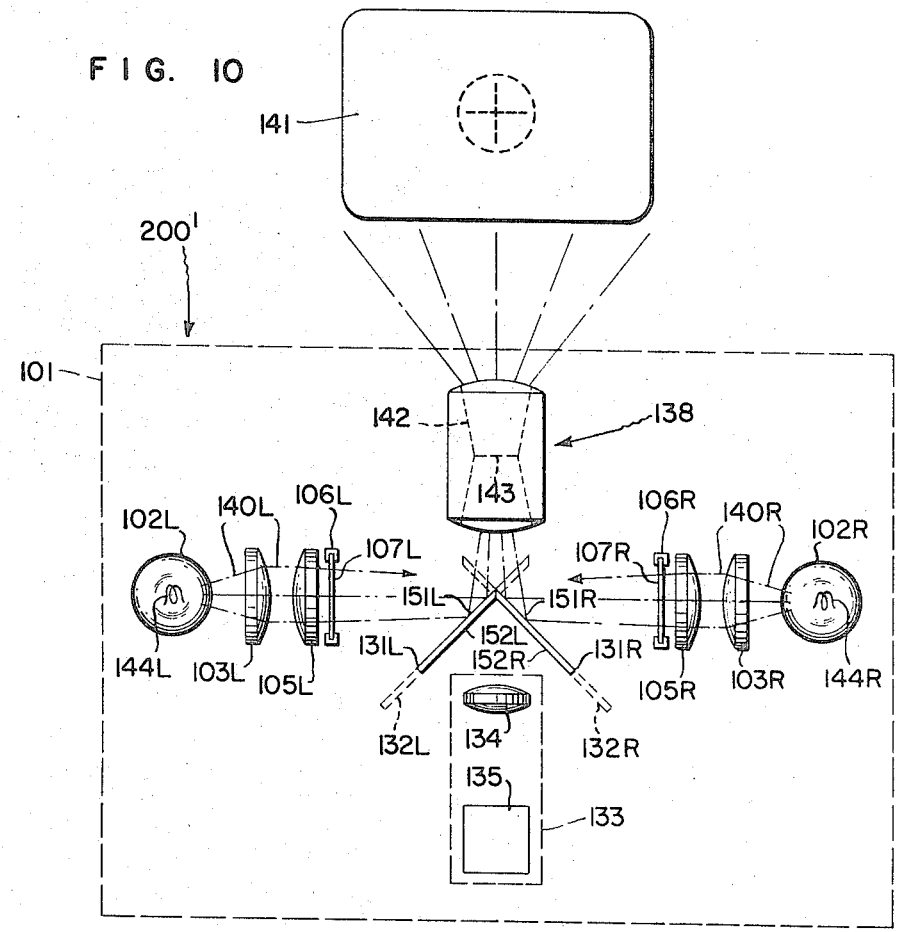

FIGS. 8a, 8b, and 8c are, respectively, an exploded perspective view and two top views of means for positioning the movable mirrors of the slide projector shown in FIGS. 5–7;

FIG. 9 is a side view of an arrangement for previewing slides placed in the slide projector shown in FIGS. 5–7;

FIG. 10 is a top view of an alternate form of the slide projector shown in FIGS. 5–7;

FIG. 11 is an exploded perspective view of a modified form of the movable mirrors of the slide projector shown in FIG. 8a;

FIG. 12 is a plan view of a modified form of a means for positioning the movable mirrors of the slide projector shown in FIGS. 8b and 8c which can be used with the modified form of the movable mirrors shown in FIG. 11;

FIG. 13 shows a perspective view of a modified form of a slide previewing unit shown in FIGS. 5, 6, 7, 9, and 10 having a lens connected for movement with the modified form of the mirror moving means shown in FIGS. 11 and 12.

Referring to FIGS. 1–4 in more detail, there is shown a first embodiment of the invention in an exemplary slide projector 100. The basic elements of the projector 100 are shown mounted in a projector housing 1, the housing being represented by broken lines. A light source, such as a lamp 2, is centered at the rear portion of the housing 1. The lamp 2 has a filament 44. First and second light condensing lens systems are symmetrically positioned to the right and left sides of the lamp 2. Each condensing lens system includes a lens 3, a mirror 4 and a lens 5. The optical elements of the right and left hand, as viewed in the drawings, condensing lens system are identified, respectively, by the suffixes R and L. In each condensing lens system the optical axes of the lenses 3 and 5 are substantially at right angles with respect to each other and the mirror 4 is positioned at an angle of 45° with respect to these axes so as to direct light from the lens 3 to the lens 5. For the purposes of the specification and the associated claims, the optical axis of each condensing lens system is defined as being coincident with the axis of the lens 5.

Positioned immediately adjacent the lenses 5R and 5L, respectively, are slides receiving compartments 6R and 6L. Photographic slides 7R and 7L are shown placed in the slide receiving compartments 6R and 6L, respectively. The slides 7R and 7L are respectively positioned by the compartments 6R and 6L across and perpendicular to the axis of the respective condensing lens systems. For the purposes of illustration, the slide 7R carries only the picture of a CIRCLE while the slide 7L carries only the picture of a CROSS.

Positioned beyond the slide receiving compartment 6R and along the axis of the right hand condensing lens system is a movable mirror means 8R. In a similar manner, a movable mirror means 8L is positioned beyond the slide compartment 6L. The mirror means 8R comprises a frame member 9R with slots 15R and 16R formed in the member 9R to provide guide means. Fixed pins 17R and 18R are mounted on the housing 1 and the frame member 9R is positioned on the housing 1 so that the slots 15R and 16R receive the pins 17R and 18R, respectively. Thereby, a straight line of travel along the axis of the right hand condensing lens system is defined for the mirror means 8R. Mounted on the end of the frame member 9R nearest the slide compartment 6R is a mirror 19R having a plane reflecting surface. The mirror 19R is mounted with its reflecting surface at a 45° angle with respect to the axis of the lens 5R. Gear teeth 20R are formed along the side of the frame member 9R facing towards the center line of the projector. A spring 21R is attached between the housing 1 and the end of the frame member 9R remote from the mirror 19R. The spring 21R takes the play or slack out of the movement of the movable mirror means 8R.

A movable mirror means 8L is constructed as a mirror-image of the mirror means 8R for mounting on the left side of the housing 1, but otherwise corresponds with the mirror means 8R. The reference numbering of the mirror means 8L and its associated elements corresponds with that for the mirror means 8R, except that the suffix L is used instead of the suffix R.

Mounted to be movable across the center line of the projector 100 and between the movable mirror means 8R and 8L is a movable mirror means 25. The mirror means 25 comprises a frame member 26 with slots 27 and 28 formed therein to provide guide means. Fixed pins 29 and 30 are mounted on the housing 1. Frame member 26 is positioned on the housing 1 so that the slots 27 and 28 receive the pins 29 and 30, respectively. Thereby, a straight line of travel perpendicular to the axes of the left and right hand condensing lens systems is defined for the mirror means 25. Mounted on the frame member 26 are mirrors 31R and 31L each of which has a plane reflecting surface. The mirrors 31R and 31L are positioned adjacent to each other on the right and left sides, respectively, of the frame member 26 with their reflecting surfaces facing away from each other. The reflecting surfaces of the mirrors 31R and 31L are perpendicular with respect to each other. The reflecting surface of the mirror 31R faces and is parallel with the reflecting surface of the mirror 19R. Similarly, the reflecting surface of the mirror 31L faces and is parallel with the reflecting surface of the mirror 19L. Gear teeth 32 are formed along the side of the frame member 26 nearest the gear teeth 20R and 20L Positioning means comprised of a gear 35 and selectively operable drive means 36 are shown for simultaneously positioning the mirrors 19R, 31R and 31L. The gear 35 is pivotally mounted for rotation on the housing 1 to engage the teeth 20R, 20L and 32 of the frame members 9R, 9L and 26, respectively. The drive means 36 may be a manually operated crank, an electric motor, or other conventional means for driving the gear 35.

Positioned above the gear 35 along the center line of the projector 100 is a conventional projecting lens system 38. The lens system 38 is mounted on the housing 1 so that its axis is parallel with and lies substantially in a common plane with the axes of the right hand and left hand condensing lens systems. The dash lines 42 indicate the effective light path defined by the lens system 38 for projected light. The dash line 43 indicates the node of the lens system 38. The node 43 is the narrowest position of the effective light path defined by the lens system 38.

In operation, light from the lamp 2 is collected by the lenses 3R, 3L and formed by the respective condensing lens systems into converging light beams 40R, 40L. The function of each condensing lens system is to deviate light from the lamp 2 inward so that light directed to the projecting lens system 38 just fills the effective light aperture or window of the projecting lens system 38 and is projected therethrough. The slides 7R and 7L are illuminated by the respective light beams 40R and 40L. Since the slides 7R and 7L are located immediately adjacent the lenses 5R and 5L, light from substantially all points on the filament 44 illuminates every point on each of the slides.

In FIG. 1, the mirror 19L is positioned in-line with the mirror 31L and the mirror 31L is positioned across the axis of the projecting lens system 38. Therefore, substantially all the light transmitted from the slide 7L is reflected by the mirrors 19L and 31L to the projecting lens system 38. The projecting lens system 38 is focused so as to form an image of the slide 7L on a viewing screen 41. Hence, the CROSS on the slide 7L is projected onto the screen 41. In FIG. 1, no light from the right hand condensing lens system is being directed to the viewing screen 41 since the lens 19R is positioned out-of-line with respect to the lens 31R, and the lens 31R is positioned to the right side of the projector, out-of-line with the projecting lens system 38.

As is hereinafter discussed, the mirrors 19L, 31L and the mirrors 19R, 31R each selectively define unobstructed, constant, equal length light paths between their associated slide receiving compartments 6 and the projecting lens system 38. The left and right condensing lens systems are each designed for these constant equal length light paths so that light selectively transmitted from the slides 7L, 7R just fills the node 43 of the projecting lens system 38, and an image of the filament 44 of the lamp 2 is formed thereat.

In FIG. 2, the gear 35 is shown as having been rotated clockwise by means of the driving means 36 in order to reposition the frame members 9L, 9R and 26. Thereby, the mirrors 19L, 31L and 19R, 31R have been repositioned along lines of travel at right angles with respect to each other. The mirror 19L has been moved away from the slide 7L, slightly out-of-line with the mirror 31L, while the mirror 19R has been moved toward the slide 7R, partially in-line with the mirror 31R. At the same time, the mirrors 31L and 31R have been moved to the left so that the mirror 31L is slightly out-of-line with the projecting lens system 38 while the mirror 31R is partially in-line therewith. The result of this right angled movement of the mirrors 19L, 31L and 19R, 31R is that the image of the CROSS commences to be removed on the viewing screen 41 while the image of the CIRCLE on the slide 7R commences to appear in an infused manner on the screen 41. In FIG. 2, the CROSS is shown solid and the CIRCLE is shown in broken lines on the screen 41 to indicate that the CROSS is being removed and the CIRCLE is being infused thereon.

Since the mirrors 19L, 31L and 19R, 31R are each moved equal distances along their respective lines of travel, the perpendicular distance between the planes of the reflecting surfaces of the mirrors 19L, 31L and the mirrors 19R, 31R each remain constant. Therefore, the lengths of the aforementioned light paths defined by the mirrors 19L, 31L and the mirrors 19R, 31R are maintained constant. As a consequence, the images of the CROSS and the CIRCLE stay in focus on the screen 41 as the mirrors 19L, 31L and 19R are positioned relative to each other.

In FIG. 3, the gear 35 is shown as having been rotated further clockwise so that the mirrors 31L and 31R are positioned, respectively, to the left and right of the axis of the projecting lens system 38. The mirror 19L has been moved away from the slide 7L so that it is now substantially half in-line and half out-of-line with respect to the mirror 31L. At the same time, the mirror 19L has been moved toward the slide 7R so that it is also now substantially half in-line and half out-of-line with respect to the mirror 31R. In this manner a change occurs in the light directed from the slide 7L to the viewing screen 41. At the same time an opposite change in light that is directed from the slide 7R to the viewing screen 41 with the result that the images of the CROSS and CIRCLE formed on the screen 41 are continuously maintained at equal intensity. The CROSS and CIRCLE have both been shown in dash lines in FIG. 3 to indicate that their images are of equal intensity during the time in which the circle image is being infused on the image of the cross.

Referring now to FIG. 4, the gear 35 is shown as having been selectively rotated further clockwise. The mirror 19L has been moved completely out-of-line with the mirror 31L and the mirror 31L has been moved to the left completely out-of-line with the projecting lens system 38. Therefore, no light from the slide 7L is directed to the projecting lens system 38 and the CROSS has been removed from the viewing screen 41. At the same time, the mirror 19R has been moved towards the slide 7R into line with the mirror 31R, while the mirror 31R has been moved into line with the projecting lens system 38. Hence, substantially all the light transmitted by the slide 7R is directed to the projecting lens system 38 and projected on the viewing screen 41. Therefore, the image of the CIRCLE is shown in a solid line in FIG. 4.

In summary, it has been shown that by rotating clockwise, the gear wheel 35 from its position in FIG. 1 to its position in FIG. 4 that an infused transition occurs on the viewing screen 41 from the image of the slide 7L to the image of the slide 7R. The image of the CROSS on the slide 7L thus dissappears, while the image of the CIRCLE on the slide 7R is being infused on the viewing screen 41. This disappearance of the CROSS from the screen 41 thus takes place in a manner similar to but in a reverse direction to the infused transition which simultaneously occurred while the projected image of the CIRCLE of slide 7R is infused on the projected image of the CROSS. More specifically this unique infusion is accomplished by what may be termed a first movable light directing or mirror means including the mirrors 19L and 31L. These mirrors are moved equal distances along mutually perpendicular lines of travel and selectively define between the slide receiving compartment 6L and the projecting lens sysetm 38 a first unobstructed constant length light path. In a similar manner, the infusion of the image of the CIRCLE on the screen 41 is accomplished by what may be termed a second movable light directing or mirror means including the mirrors 19R and 31R. These mirrors are also moved equal distances along mutually perpendicular lines of travel and selectively define a second unobstructed constant length light path between the slide receiving compartment 6R and the projecting lens system 38. It is noted that the gear 35 may be rotated counterclockwise from its position in FIG. 4 back to FIG. 1 position thereby to make a transition by infusion of a projected image of the slide 7L on the image of the slide 7R. With the projector 100, light is always being directed to the viewing screen 41 at the same intensity so that the viewer will never experience a dark screen or the undesired fade in and fade out projecting image phenomena that is inherent in the previously mentioned projectors that employ a lap dissolve principle for changing slides.

In the projector 100, substantially all the light transmitted by the slides 7 is received and reflected by the respective mirror 19. The transition by infusion provided by the projector 100 may thus be said to occur at the reflecting surfaces of the mirrors 31 since light reflected by the mirrors 19 is only selectively directed by the mirrors 31 to the projecting lens system 38. As is hereinafter explained, the extent to which this transition by infusion approaches a perfect infusion depends upon the proximity of the mirrors 31 to the node 43 of the lens system 38.

The make-up of the projected light beam at the node 43 must be examined in order to understand the nature of the transition by infusion provided by the projector 100. Recalling that light from all points of the filament 44 of the lamp 2 illuminates every point on the slide 7 and the filament 44 is imaged at the node 43, it follows that the projected image of the slide or slides 7 is completely out of focus at the node 43. Light from every point on the slide or slide 7 passes through every point of the plane of the node 43. It is apparent, then, if one would shutter part of the light beam at the node 43, that no part of the projected image would be cut-off, but rather the entire image would be uniformly dimmed to produce a perfect dissolve. In contrast, if the light transmitted by the slides 7 were instead shuttered at the film planes of the slide 7, a perfect line lap transition would be effected with the projected image being cut-off and wiped across the viewing screen 41.

In the projector 100, the light transmitted from the slides 7 to the lens system 38 is in effect "shuttered" at the reflecting surfaces of the mirrors 31. Since the mirrors 31 are located in the light paths between the film plane of the slides 7 and the node 43 of the lens system 38, it is apparent that the projector 100 provides neither a perfect line lap, nor a perfect lap dissolve transition. Rather, the projector 100 provides a transition by infusion which is a combination of the two effects.

In the projector 100, the mirrors 31 are intentionally located very close to the entrance of the projecting lens system 38. As a result, the distance from the mirrors 31 to the node 43 is small in comparison to their distance from the slides 7. Since the transition provided by the projector 100 is a transition by infusion a projected image can be readily removed and another image added to replace it without this image transferal being apparent to one viewing screen 41. It is additionally noted that by moving the mirrors 31 closer to the node 43 that their transition by infusion would enhance this transition while moving the mirrors 31 away from the node 41 and towards the slides 7 would make this transition more pronounced.

Referring to FIGS. 5–7, there is shown the basic elements of a slide projector 200 comprising a second embodiment of the present invention. The elements of the slide projector 200 are mounted in a projector housing 101 which is shown by broken lines. A light source such as a lamp 102 is centered at the rear portion of the housing 101. The lamp 102 has a filament 144. First and second light condensing lens systems are symmetrically positioned to the right and left sides of the lamp 102, as viewed in the drawings. Each condensing lens system includes lens 103, a mirror 104 and a lens 105. The optical elements of the right and left hand condensing lens systems are again identified respectively by the suffixes R and L. In each condensing lens systems the optical axes of the lenses 103 and 105 are substantially at right angles with respect to each other. The mirror 104 is positioned at an angle of 45° with respect to these axes so as to direct light from the lens 103 to the lens 105. The optical axis of each condensing lens system is coincident with the optical axis of the associated lens 105.

Slide receiving compartments 106R and 106L are positioned, respectively, immediately adjacent the lenses 105R and 105L. Photographic slides 107R and 107L are shown placed in the slide receiving compartments 106R and 106L, respectively. The slides 107R and 107L are positioned by the compartments 106R and 106L across and perpendicular to the axes of the respective condensing lens systems. For purposes of illustration, the slide 107R carries only the picture of a CIRCLE while the slide 107L carries only the picture of a CROSS.

Positioned beyond the slide receiving compartment 106R and across the axis of the right condensing lens system is a fixedly mounted mirror 119R. The mirror 119R has a plane reflecting surface and is mounted on the housing 101 so that its plane reflecting surface makes an angle of 45° with the axis of the right hand condensing lens system. In a similar manner, a fixed mirror 119L is mounted on the housing 101 beyond the slide compartment 106L.

Movably positioned at the front portion of the projector housing 101 are a pair of plane mirrors 131R and 131L. The mirror 131R has on its front and back faces plane and parellel reflecting surfaces 151R and 152R, respectively. The reflecting surfaces 151R and 152R are back-to-back with respect to each other. Similarly, the mirror 131L has plane and parallel reflecting surfaces 151L and 152L on its front and back faces, respectively. The mirrors 131 are mounted on positioning means 145 shown in FIG. 8a. The mirror 131R is mounted on the positioning means 145 so that the reflecting surfaces 151R and 152R are parallel to the reflecting surfaces of the mirror 119R. The mirror 131L is mounted in a similar manner on the positioning means 145 so that the reflecting surfaces 151L and 152L are parallel to the reflecting surface of the mirror 119L. The positioning means 145 is discussed in greater detail hereinafter and is selectively operable to position the mirrors 131R, 131L along the paths of travel defined, respectively, by the broken lines 132R, 132L. The paths 132R and 132L are defined so as to be mutually perpendicular and to cross each other at the center line of the housing 101. The path 132R is parallel to the plane of the reflecting surface of the mirror 119R and the path 132L is parallel to the plane of the reflecting surface of the mirror 119L.

Referring now to FIG. 8a, there is shown an exploded view of one form of positioning means 145 suitable for use in carrying out the present invention. The illustrated positioning means 145 comprises a rectangular plate 160, right and left planar members 161R, 161L and a pivotable member 162. The plate 160 has a center line 164 and is mounted on the projector housing 101 so that the center line 164 is coincident with the center line of the housing 101. Crossing grooves 163R and 163L are formed in the plate 160 at right angles to each other. The grooves 163R and 163L are symmetrically formed about the center line 164 of the plate 160 and define mutually perpendicular paths of travel for the planar members 161R and 161L.

The planar members 161R and 161L are each trapezoids similarly dimensioned except that the member 161R is constructed for the right side of the positioning means 145 while the member 161L is constructed for the left side. The planar member 161R has edges numbered counter-clockwise 165R–168R while the member 161L has edges numbered clockwise 165L–168L. In each of the members 161R and 161L, their associated edges 166 and 168 are parallel with each other and their edges 167 make right angles with their edges 166 and 168. Also in each of the members 161R and 161L, their edges 165 make an angle of 135° with the edges 166 and an angle of 45° with the edges 168.

The planar members 161R and 161L are arranged to carry the mirrors 131R and 131L, respectively, and are slidably mounted on the plate 160 so that the edges 165R and 165L slide against each other. As shown in FIG. 8a, the members 161 each have runners 169 mounted on their lower surface. The runners 169 are mounted parallel to the edges 168 and fit into the associated grooves 163. Mounted on the upper surface of the members 161 are the mirrors 131. The mirror 131R is positioned on the member 161R with the reflecting surfaces 151R and 152R parallel to the edge 168R and perpendicular to the plane of the member 161R. Likewise, the mirror 131L is positioned on the member 161L with the reflecting surfaces 151L and 152L parallel to the edge 168L and perpendicular to the plane of the member 161L. As shown in FIG. 8a, the mirrors 131 are mounted on the respective planar members 161 so that one tapered end of each of these mirrors just touches their associated edges 165L, 165R so that these associated end of the mirrors 131 contact each other when they are in the position as shown in FIG. 8. The planar members 161R and 161L further have slots 170R and 170L cut therein, respectively. The slots 170 are cut at right angles to the edges 166 and 168 and their function is explained below.

The pivotable member 162 is an isosceles triangular planar member having a pivot point 172 at the apex corner thereof. A downward projecting pin 171R is mounted on the right base corner of the member 162. Similarly, mounted on the left base corner of the member 162 is a downward projecting pin 171L. As shown in FIG. 8a and 8b, the pins 171R and 171L are fitted into the slots 170R and 170L. The center line of a pin means 173 that passes thru member 162 and into plate 160 forms the common axis extending thru the pivot points 172, 174 and thru the center line 164 of the plate 160. The component parts of the positioning means 145 are appropriately dimensioned so that the perpendicular paths of travel 132R and 132L are defined, respectively, for the mirrors 131R and 131L. As is explained hereinafter, the positioning means 145 is selectively operable by positioning the member 162, thereby to simultaneously position the mirrors 131 along their respective lines of travel.

Referring again to FIG. 5, a conventional projecting lens system 138 is mounted along the center line of the projector 200. The lens system 138 is mounted so that its optical axis is parallel with and lies substantially in a common plane with the optical axes of the right and left hand condensing lens systems. The effective light path defined by the lens system 138 is indicated by the broken lines 142. The node of the lens system 138 is indicated by the broken line 143.

Positioned near the center of the housing 101 is a slide previewing means 133. The previewing means 133 is positioned along the center line of a housing 101 so as to receive light reflected from the back reflecting surfaces 152R, 152L of the mirrors 131R, 131L. The previewing means 133 is shown in more detail in FIG. 9 and includes a rear projection previewing screen 135, such as a ground glass plate, and light directing means comprised of a lens 134, a mirror 136 and lens 134a. The lens 134 is positioned with its optical axis on the center line of the housing 101 and coaxial with the projecting lens system 138, thereby to receive light from the back reflecting surfaces 152R and 152L of the mirrors 131R and 131L. The mirror 136 has a plane reflecting surface and is positioned with its reflecting surface at an angle of 45° with respect to the axis of the lens 134. The previewing screen 135 and lens 134a is positioned directly above the mirror 136 in a conventional manner so that a light path having a fixed length is defined between the slide to be previewed and the previewing screen 135. The focal length of the lens 134 is appropriately selected such that an image of either of the slides 107 may be formed on the screen 135. Thereby, means are provided for previewing the next slide to be projected.

The projector 200 operates in substantially the same manner as the hereinbefore described projector 100. Light from the lamp 102 is collected by the right and left hand condensing lens systems and formed in converging light beams 140R and 140L, respectively. The slides 107R and 107L are illuminated by the respective light beams 140R and 140L. Light from substantially all points on the filament 144 of the lamp 102 illuminates every point on each of the slides 107R and 107L since the slides are located immediately adjacent the lenses 105R and 105L.

In FIG. 5, the mirrors 131 are illustrated as being positioned by the positioning means 145 as shown in FIG. 8b. The mirror 131L is positioned at the right limit of its path of travel 132L across the axis of the projecting lens system 138 and in-line with the mirrors 119. Substantially all the light transmitted by the slide 107L and reflected by the mirror 119L is then directed by the reflecting surface 151L to the projecting lens system 138. The projecting lens system 138 is focused so as to form an image of the slide 107L on a viewing screen 141 and hence, the CROSS on the slide 107L is projected onto the screen 141. At the same time, light transmitted by the slide 107R is reflected by the mirror 119R and the reflecting surface 152L to the previewing means 133. Consequently, light from the slide 107R is received by the lens 134 and an image of the CIRCLE on the slide 107R is formed on the previewing screen 135. It is noted that in FIG. 5 the mirror 131R is positioned at the right limit of its path of the travel 132R completely out-of-line with the mirrors 119. Therefore, the mirror 131R is not being used and no light is being reflected thereby.

In FIG. 6, the mirrors 131L and 131R are shown in an intermediate position, respectively, to the left and right of the axis of the projecting lens system 138. This positioning of the mirrors 131 corresponds to the position of the positioning means 145 as shown in FIG. 8a. This position occurs when the positioning means 145 has been moved to a position where the planar members 161L and 161R are symmetrically oriented with respect to the center line 164 by rotating the pivotable member 162 counterclockwise from its position shown in FIG. 8b. The action of the pins 171 in the slots 170 operates to slide the planar member 161L and its associated runner 169L down and to the left in groove 163L while sliding the planar member 161R up and to the left in groove 163R. The mirrors 131L and 131R are both moved to the left in their planes of travel defined by the paths 132L and 132R until they are substantially half in-line and half out-of-line with respect to the mirrors 119 and the projecting lens system 138. During the movement a certain amount of light directed from the slide 107L to the viewing screen 141 is thus cut off while at the same time an increase in the quantity of light equal to the amount cut off is directed from the slide 107R to the viewing screen 141 with the result that images of both the CROSS and CIRCLE are formed on the screen 141. The CROSS and CIRCLE have been shown in broken lines in FIG. 6 to indicate that the image they form is bright and of a desired fixed intensity. It is noted that, with the mirrors 131R and 131L positioned as shown in FIG. 6, the light paths to the back reflecting surfaces 152R and 152L are blocked so that no light is reflected to the previewing means 133. The previewing screen 135 is thus dark for a split instant of time as shown in FIG. 6 while the mirrors 131L, 131R are moved between their solid line positions shown in FIGS. 5 and 7.

Referring now to FIG. 7, the mirror 131L is shown as having been moved to the left limit of its path of travel 132L, completely out-of-line with the mirror 119L. At the same time, the mirror 131R has been moved across the axis of the projecting lens system 138 and in-line with the mirror 119R. This positioning of the mirrors 131 corresponds to the position of the positioning means 145 as shown in FIG. 8c and may be accomplished by rotating the pivotable member 162 counterclockwise from its position shown in FIG. 8a. The action of the pins 171 in the slots 170 operates to slide the planar member 161L down and to the left of the center line 164 while sliding the planar member 161R up across the center line 164. No light is now directed by the mirror 131L since it is not in-line with either of the mirrors 119. Substantially all the light transmitted through the slide 107R, however, is now directed to the projecting lens system 138 by the reflecting surface 151R and the image of the CIRCLE is projected onto the screen 141. At the same time light from the slide 107L is directed off the back reflecting surface 152R to the previewing means 133 and the image of the CROSS is formed on the previewing screen 135.

In summary, it has been shown that by rotating the pivotable member 162 of the positioning means 145 counterclockwise that the mirrors 131R and 131L may be selectively moved from their position in FIG. 8b to their position in FIG. 8c. Thereby, a transition by infusion is caused to occur on the viewing screen 141 from the image of the slide 107L to the image of the slide 107R. The removal of the image of the CROSS from the viewing screen 141 is accomplished by what may be termed a first movable light directing or mirror means comprised of the movable mirror 131L. The mirror 131L is moved by the positioning means 145 along a line of travel parallel to the reflecting surface of the mirror 119L. Thus, the reflecting surface 151L is moved in the plane it defines and the perpendicular distance between the plane of the reflecting surface of the mirror 119L and the plane of the reflecting surface 151L remains substantially constant. Thereby, a first unobstructed constant length light path is selectively defined between the slide receiving compartment of gate 106L and the projecting lens system 138. In a similar manner, the infusion of the image of the CIRCLE on the screen 141 is simultaneously accomplished by what may be termed a second movable light directing or mirror means comprised of the mirror 131R. The mirror 131R is moved by the positioning means 145 along a line of travel parallel to the reflecting surface of the mirror 119R, thereby to selectively define a second unobstructed constant length light path between the slide receiving compartment of gate 106R and the projecting lens system 138. It is noted that by moving the pivotable member 162 from its position in FIG. 8c clockwise to its position in FIG. 8b that a transition by infusion may be made during the shift from the image of the slide 107R back to the image of the slide 107L. The projector 200 also projects the image of the slide not being shown on the show screen 141 by means of the reflecting surfaces 152R or 152L to the previewing means 133.

In the projector 200, substantially all light transmitted by the slides 107 is received and reflected by the respective mirrors 119. The transition by infusion provided by the projector 200 thus occurs at the reflecting surfaces 151R and 151L of the mirrors 131 since light reflected by the mirrors 119 is only selectively directed by the mirrors 131 to the projecting lens system 138. Therefore, light transmitted from the slides 107 to the lens system 138 is in effect "shuttered" at the reflecting surfaces 151R and 151L. Since the mirrors 131 are located in the light paths between the film plane of the slides 107 and the node 143 of the lens system 138, it is apparent that, in the projector 200 as in the projector 100 an infusion or an even flow of the image at a constant intensity occurs rather than line lap or a lap dissolve transition. The projector 200 thus provides a transition by infusion which eliminates the distracting and light intensity fading effect of presently available line lap and lap dissolve projectors. Since, in the projector 200, the distance from the mirrors 131 to the node 143 is small in comparison to their distance from the slides 107 no distraction of the projected image will be present while a first projected image is replaced by infusing a second image thereon in the projector 200.

Referring to FIG. 10, a slide projector 200' is shown therein. The projector 200' employs as a light source first and second lamps 102R and 102L for forming, respectively, the light beams 140R and 140L. The projector 200', with the exception of the dual lamp light source, is similar in all significant respects to the previously described projector 200 and has its components numbered to conform with the numbering of the projector 200. Since two lamps are used in the projector 200', the mirrors 104 and 119 employed in the projector 200 are not necessary. Additionally in the projector 200', the optical axes of the right and left hand condensing lens systems are coaxial, and the projecting lens system 138 is mounted so that its optical axis is perpendicular to the axes of the right and left hand condensing lens systems. The axes of the right and left hand condensing lens systems and the projecting lens system 138 lie in a common plane and intersect in a common point located at the intersection of the paths of travel 132R and 132L defined, respectively, for the mirrors 131R and 131L. The projector 200' is shown with the mirrors 131R and 131L selectively positioned so as to form images of the CROSS and CIRCLE on the screen 141. With the exceptions above noted, the description of the operation of the projector 200 is also applicable to the projector 200'.

FIGS. 11 and 12 show a perspective plan view of a modified form of the means employed to position the movable mirrors 131L', 131R' of the projector 200 that could be employed in lieu of the mirror positioning means previously referred to under the description of FIGS. 8a – 8c.

The same associated reference numerals that were previously used for the parts shown in FIGS. 8a – 8c have been used along with the addition of a prime placed after each of these numerals in FIGS. 11 and 12 to identify parts which are similar to but of a more preferred type than the parts described to these parts set forth under the description of FIGS. 8a – 8c.

One desirable distinct difference in construction that exists in FIG. 11 version that is not present in FIG. 8 version is that instead of the mirrors 131L' and 131R' being mounted directly on their associated planar members 161L' and 161R' for movement therewith they are instead mounted as shown in FIG. 11, for movement on mirror support members 302, 304. In this way these mirrors 131L', 131R' and members 302, 304 can be slid as a unit by means of the dove tail runner and groove connections 306, 308; 310, 312 that connect members 302, 304 to the planar members 161L', 161R'.

The bottom of the planar members 161L', 161R' are also constructed so that they can be slid as a unit along plate 160' by means of the dove tail runner and groove connections 169R', 163R'; 169L', 163L'. The drive pin means 173' can be manually rotated in a clockwise or counterclockwise direction as indicated or can be rotated in any aforementioned manner by suitable electrically controlled oscillating device such as a reversible solenoid 316. The upper end of the drive pin 173' protrudes through and is fixedly connected by a suitable press fit, a key or welding material to the pivotal member 162' so that the pivotal member 162' can be oscillated about its pivot point 172' by the rotatable solenoid 316. While the oscillating movement of the solenoid 316, pin 173' and pivotal member 162' take place the downwardly directed drive pins 171L' and 171R' that are mounted for slidable movement in the respective slots 170L' and 170R' will cause the planar members 161L' and 161R' to be slid along their associated slots 163L', 163R' in a manner similar to that previously described under the description of FIGS. 8a and 8b.

It should be noted that the separate switch actuating rods 317, 317a that are shown mounted on each of the planar members 161L, 161R can alternately be employed to actuate switches which lie in the path of these rods 317, 317a and which are electrically connected to a solenoid, not shown, to alternately drive the shaft 314 is a prescribed time sequence alternatively in a clockwise and counterclockwise direction in lieu of employing the reversible solenoid 316 previously described.

FIGS. 11 and 12 shows separate bearing members 318, 320 that are each fixedly mounted by two threaded screw connections 322, 324; 326, 328 to the plate 160'.

Threaded screw members 330, 332 are each shown (FIGS. 11, 12) mounted on non threaded portions thereof for slidable movement in their associated bearing members 318, 320.

Surrounding a non threaded portion that extends between the respective head 334, 336 of each member 330, 332 and one end of each of the bearing members 318, 320 there is shown associated coil springs 338, 340 and mounted on the other opposite threaded end portions of each of these members is shown an adjustable nut 342. 344.

During a one half portion of the slide projection cycle which occurs during a counterclockwise movement of the pivotal member 162' about its pivot point 172' towards the position shown in FIG. 12 a boss 346 that is integral with and which extends in an upward direction from the then moving planer member 161L' will be brought into contact with the embossed pin shaped portion 348 that forms in integral part of the support member 304 on which the mirror 131L' is fixedly mounted. Further movement of the planar member 161L' with its protuberance 346 in contact with the pin 348 will cause this pin 348 and its associated mirror support member 304 and mirror 131L' to move further in unison with planar member 161L' and in a direction toward the position shown in FIG. 12. As the pin 348 is moved through the midpoint of its travel in the last mentioned direction pin 348 will engage and force the head 336 of the screw member 332 against one end of the coil spring 340. Since the other end of this spring 340 is in engagement with a stationary bearing member 320 it will be compressed and increasing amounts of energy will be stored therein until the pivotal member 162' reaches the end of its travel.

It should be noted at this point that the clockwise movement of the pivotal member 162' may take place before counterclockwise rotation of the member 162' just described when it is desired to project an optical image, such as the image of slide 107R shown in FIG. 7, on a show viewing screen 141 and to simultaneously preview a slide 107R on a preview screen, e.g., screen 135 of FIG. 7 on the modified preview screen 350 of FIG. 13 to be described later.

The clockwise movement of the pivotal member 162' can also be accomplished after the operation affected by the counterclockwise rotation of the member 162' previously described since the solenoid pin 173' is oscillatable in either a clockwise rotated position or a counterclockwise position.

During the other half portion of the slide projectors cycle the pivotal member 162' shown in FIG. 12 is moved in a clockwise direction about its pivot point 172' back through the position shown for this member in FIG. 11 and thence to the position in which the mirrors 131L' and 131R' have been moved to a position similar to the position for the mirrors 131L, 131R that are shown in solid line form in FIG. 5.

During the initial stage of the last mentioned half portion of the projector cycle on which the pivotal member 162' is rotated clockwise the left spring 340 shown in FIG. 12 is allowed to release its energy as it expands and it simultaneously forces the head 336 of the screw member 332 into surface-to-surface contact with the pin 348 so that the pin can be retained in surface-to-surface contact with the boss 346 that forms an integral portion of the planar member 161L'.

In this way it is possible to keep the mirror 131L' in joint moving relationship with the planar member 161L' as the planar member 161L' is moved from its FIG. 12 position towards its FIG. 11 position. This joint movement of the mirror 131L and the planar member 161L' continues until the most forward tip 352 of a dove tail runner 312 at the base of the mirror support 304 contacts the rail surface 354 of the planar member 161R'. When this occurs the mirror support 304 remains stationary while the planar member 161L' continues in a forward direction toward the upper right corner of the drawing and the planar member 161R' simultaneously continues to move in a rearward direction away from its show position, shown in FIG. 7, along with its mirror support 302 and mirror 131R'and, as in FIG. 7, along the groove 163R' toward the position shown in FIG. 5.

As this last mentioned rearward movement proceeds a point will be reached when the end portion 356 of the rail stop surface 354 will be moved past and out of the way of the most forward tip 352 of the then stopped dove tail runner 310 of mirror support 304. When this occurs the mirror support 304 and its mirror 131L' will be rapidly moved further in a forward direction along groove 312, due to the stored energy in the then expanding spring 340, into a position shown in FIG. 11.

As pivotal member 162' is rotated further in a clockwise direction from the position shown for the mirrors 131L, 131R in FIG. 11 to the position shown for the mirrors shown in FIG. 5 the planar member 161L' will continue to move with the mirror 131L' supported thereon in a forward direction and the planar 161R will continue to move with the mirror 131R' supported thereon in a rearward direction.

It can also be seen that as the mirror 131R' is moved as shown in FIG. 12 to its FIG. 5 position that the boss 358 which is integral with and which extends in an upward direction from the then moving planar member 161R' will be brought into contact with an embossed pin shaped portion 360 that forms an integral part of the support member 302 on which the mirror 131R' is fixedly mounted. After the boss 358 on planar member 161R contacts the pin 360 it will cause the pin 360 and its associated support members 302 and mirror 131R' to move further in unison with planar member 161R' and in a direction toward the position shown in FIG. 5. As the pin 360 is moved through the mid point in the last mentioned direction pin 360 will engage and force the head 334 of the screw member 330 against one end of the coil spring 338. Since the other end of the spring 338 is in engagement with a stationary bearing member 318 it will be compressed and increasing amounts of energy will be stored therein until the pivotal member 162' and planar member 161R' reaches the end of its travel in the last mentioned rearward direction. When the direction of the movement of pin 173' associated with solenoid 316 and its associated pivotal member 162' is then reversed from the clockwise rotation to counterclockwise rotation the planar member 161L' and mirror 131L' (FIG. 11) will be moved away from a position similar to that shown for mirror 131L in FIG. 5 in a rearward direction towards the position shown in FIG. 12. While this movement takes place the most forward tip 362 of a dove tail runner 306 at the base of the mirror support 302 continues in a forward direction with mirror 131R until it contacts the rail surface 364 of the planar mirror 161L'. When this occurs mirror support 302 remains stationary while the planar member 161R' continues in a forward direction toward the upper left corner of the drawing and the planar member 161L' simultaneously continues to move in a rearward direction away from the position shown in FIG. 5. This action allows mirror support 304' and mirror 131L' to move from the position shown in FIG. 5 along the groove 163L' toward the position shown in FIG. 7.

As this last mentioned movement proceeds a point will be reached when the end of portion 363 of the rail stop surface 364 will be moved in a rearward direction and out of the way of the most forward tip 362 of the then stopped dove tail runner 306 of mirror support 302. When this occurs the mirror support 302 and its mirror 131R' will be moved further in a forward direction along groove 308 due to the stored energy of the then expanding spring 338 into the position shown in FIG. 11.

As pivotal member 162' is rotated further in a counterclockwise direction the planar member 161R' will continue to move with the mirror 131R' supported thereon in a forward direction and the planar member 161L' will continue to move with the mirror 131L' supported thereon in a rearward direction from their FIG. 11 positions to the same positions as that shown for the mirrors 131L and 131R in FIG. 7.

While the mirror 131L' is moved from its FIG. 11 position to its FIG. 7 position the boss 346 that is integral with and which extends in an upward direction from the moving planar member 161L' will be brought into contact with the embossed pin shaped portion 348 that forms an integral part of the support member 304 on which the mirror 131L' is mounted. After the boss 346 on plannar member 161L' contacts the pin 348 it will cause the pin 348 and its associated support member 304 and mirror 131L' to move further in unison with planar member 161L' in a direction toward the position shown in FIG. 7. As the pin 348 is moved through mid point in the last mentioned direction pin 348 will engage and force the head 336 of the screw member 332 against the one end of the coil spring 340. Since the other end of this spring 340 is in engagement with a stationary bearing member 320 it will be compressed and increasing amounts of energy will be stored therein until the pivot member 162' and planar member 161L' reaches the end of its backward travel and the cycle again repeated.

PREVIEW (FIG. 13)

As the aforementioned pivotal member 162' is moved to the left about pivot point 172' and the mirrors 131L' and 131R' are moved in the aforementioned criss-cross fashion, a first drive pin 366, of the drive pins 366, 368 that are fixedly mounted on and which protrudes in an upper direction from member 162', will be brought into driving contact with a pin 370.

Since the pin 370 is fixedly attached to a lens holder 372 its movement will cause this lens holder 372 to be slid to the left along slotted out wall surfaces 374, 376 formed in the holders that are in turn slidably mounted on lens holder support pins 378, 380. The inner end of each of the pins 378, 380 are in turn fixed to the front stationary wall 382 of the preview housing unit 133'.

Retainer plates 384, 386, 388 are fixedly connected to or may be an integral part of the pivot wall 382 and are employed to prevent the lens holder 372 from moving in an outward direction as it is slid along the lens holder support pins 378, 380.

The lens holder 372 and the lens 390, that is fixedly retained thereon, is moved as a unit by the arcuate movement of the pivotal member 162' when the pin 366 of the latter member is brought into contact with pin 370. As this occurs the holder 372 will be moved against one end of a coil spring 392, which extends forward and into contact with 394 of the front wall 382, to compress the spring 392 and store energy therein. This spring 392 when compressed will thus provide a bias for the lens holder 372 that will return it to the position shown in FIG. 13 when it is not being driven by the pivotal member 162' and pins 366, 370.

When the pivotal member 162' is arcuately moved in a direction that is opposite to that just referred to the second drive pin 368, that is fixed to the pivotal member 162', becomes the means for driving another pin 396 and the lens support 372 on which this pin 396 is mounted in a similar manner to that just described but in a left to right rather than a right to left direction through the position shown in FIG. 13.

As this left to right movement of the lens holder 372 and lens 390 takes place compression of the coil spring 398, which extends between a bent out portion 400 of the front wall 382 of the preview housing 133' and the lens holder, will occur. The spring 398 when compressed will thus provide a bias for the lens holder 372 that will return it to the position shown in FIG. 13 when it is not being driven by the motion of the pivotal member 162' and pins 368, 396.

The aforementioned movement of the lens 390 is thus synchronized in the aforementioned manner with the criss-cross motion of the mirrors 131L', 131R' previously described so that a slide such as the slide 107R illustrated in FIG. 5 can be previewed on screen 350 (FIG. 13) before the mirrors 131L', 131R' are moved to positions similar to that shown in FIG. 7 or in other words to a position in which slide 107R' is shown on a show screen 141.

Although not shown it should also be understood that a tray filled with additional slides can be mounted on the top of the projection casing 200 and suitable slide feeding means provided to move the slides 107L, 107R from their associated gates 106L, 106R back into the tray and to allow other substitute slides to drop from the tray alternately into these gates 106L, 106R.

One of the many commercially available means that are available to feed slides from a tray to a projector and for returning them to a tray is illustrated by way of an example in the Robinson U.S. Pat. Nos. 3,276,156 and 3,276,314.

FIG. 13 shows that the previously mentioned movable preview lens 390 is constructed to direct the image of the slide 107L, or 107R that is to be previewed through a 50 percent mirror 401, commonly referred to as a half mirror, onto reflecting surfaces 402, 404 that form a corner pair 406. The corner pair 406 are in turn employed to reflect the image back against the half mirror 400 which projects the image in an upward direction to a viewing screen 350 that may be made of a glass material frosted on its bottom surface and smooth on its top surface.

It should be noted that the half mirror 401 allows an unnecessary one half portion of the light reflected from the mirror 131L' or 131R' whose image is being previewed to be directed in a non utilized downward direction away from the viewing screen 350.

The structure of FIG. 13 is provided to avoid a shift in the image of the slide being projected on the preview screen 350 during the criss-cross motion of the mirrors 131 L' and 131 R' as the slides 107 R and 107 L alternately are projected on the preview screen. This shift results from the fact that the preview images are reflected from the back sides of the mirrors 131 L' and 131 R' and the fact that the mirrors have thickness.

Specifically, the translatory mechanism of FIG. 13 provides a way of maintaining the length of the optical path between the reflecting back side of either one or both of the mirrors 131L, 131R and the viewing screen 350 of the preview unit 133' substantially constant and thereby provide a better infusion of successive images of slides that are projected onto the preview screen as well as provide a way of maintaining the image being projected onto the preview screen at a desired center position thereon.

Unless a translatory mechanism as illustrated in FIG. 13 is provided, the length of the optical path between the reflecting back side of either one or both of the mirrors 131L', 131R' and the preview viewing screen 350 would be altered and the image reflected thereby would be altered and would shift away from its desired centralized position on the preview screen. This is due to the fact that only the front side of each of the mirrors is used as a reference in maintaining a fixed length optical path between each of the slides in the slide holders 106L, 106R and their associated show screen 141.

The preview lens shifting device of FIG. 13 thus in effect provides a way of shifting the image on the back side of any one or both of the mirrors 131L, 131R' being previewed on the preview screen 350 so as to have the same effect that would result if the image or images to be projected were on the respective front surface of one or both of the mirrors 131L', 131R'. In other words it is as if the one or both of the images to be previewed were reflected off a mirror of an infinitesimally thin dimension.

When a slide preview optical system employs a movable lens of the aforementioned type it will thus eliminate the undesired non uniform optical length of light path problems, the fuzzy image that would result during the infusion of one image with the other and the non centralized image problem.

The embodiments of the invention in which an exclusive property or privilege is claimed are defined as follows:

1. An optical projector, comprising means for providing a first and a second light beam, each of said light beams having separate axes that extend along a common plane,
   a first film gate positioned in the path of said first light beam whereby a first optical object placed in said first film gate is illuminated by said first light beam;
   a second film gate positioned in the path of said second light beam whereby a second optical object placed in said second film gate is illuminated by said second light beam;
   an optical projecting system; and
   first and second light beam directing means positioned intermediate said projecting system and said first and second film gates, respectively, for selectively directing said first and second beams through said projecting system,
   said optical projecting system and said first and second light beam directing means coacting simultaneously to remove and replace the projected image of one of said optical objects with the projected image of the other optical object and wherein each of said first and second light beam directing means is provided with a pair of light beam reflective surfaces for movement in a criss-cross fashion with one another, one face of each pair of reflecting faces being operably positioned to provide surfaces against which said associated second and first beams can be sequentially directed through a second optical projecting system to a preview screen while another opposite face of each of the reflecting faces are operably positioned to provide another surface against which the first and second beams can be sequentially directed through said first projecting system to a show screen, a mechanical means operable to jointly move said light beam directing means and an optical part of the said second projecting system to maintain the image being projected onto the preview screen in a central position and its optical length at a substantially constant dimension while the optical length of the image being directed against the opposite face of said directing means onto the show screen remains substantially constant.

2. An optical projector comprising means for deriving a first and a second light beam from a single light source, each of said light beams having separate axes that extend along a common plane;

a first film gate positioned in the path of said first light beam whereby a first optical object placed in said first film gate is illuminated and the image thereof is transmitted by said first light beam;

a second film gate positioned in the path of said second light beam whereby a second optical object placed in said second film gate is illuminated and the image thereof is transmitted by said second light beam;

a single optical projecting system arranged to project said light;

first and second light beam directing means operably connected for alternate criss-cross movement into a position intermediate said single optical projecting system and said first and second film gates, respectively, for selectively receiving and directing said first and second object image transmitting light beams through said single projecting system;

said optical projecting system and said first and second light beam directing means coacting simultaneously to remove and replace by infusion the projected image of one of said optical objects with the projected image of the other optical object and wherein the first and second film gates are positioned transversely of the path of their associated first and second light beams;

the length of the object image transmitting light beams extending between each film gate and said single optical projection system each defining a fixed length optical axis to thereby provide a predetermined node and a predetermined focal plane in said single projecting system;

the first and second light beam directing means are operably positioned to selectively direct the light of said first and second light beams through said projecting system along said optical axis and said directing means being constructed to define a first and a second light image fold plane for said optical axis;

said first and second light beam directing means being selectively and alternately actuatable in said criss-cross directions to maintain the total amount of light employed in the projection of the first and second optical object image substantially constant as the projected image of one of said optical objects is removed and replaced by the infusion of the projected image of the other optical object and wherein the light beam directing means is comprised of a first and second support member each operably connected for slidable criss-cross movement with respect to one another along a different one of two planar members between light beam projecting and non projecting positions;

said planar members each being operably connected to joint slidable criss-cross movement on a stationary base member, a pin extending from each of said first and second members, a boss extending from each of said planar members and positioned for separate driving engagement with a different one of said pins to cause said first and second pins and their respective first and second members to slide in a criss-cross pattern along said planar members in a first direction between said two positions, two separate spring means connected to said stationary base member, each of the pins being positioned for engagement with a separate one of said spring means, and wherein each spring means provides a biasing force for returning the pin with which it is associated, the boss, the first and second support members and the light directing means in a reverse direction between said two positions.

3. An optical projector, comprising means for deriving a first and a second light beam from a single light source, each of said light beams having separate axes that extend along a common plane;

a first film gate positioned in the path of said first light beam whereby a first optical object placed in said first film gate is illuminated and the image thereof is transmitted by said first light beam;

a second film gate positioned in the path of said second light beam whereby a second optical object placed in said second film gate is illuminated and the image thereof is transmitted by said second light beam;

a single optical projecting system arranged to project said light;

first and second light beam directing means operably connected for alternate criss-cross movement into a position intermediate said single optical projecting system and said first and second film gates, respectively, for selectively receiving and directing said first and second object image transmitting light beams through said single projecting system;

said optical projecting system and said first and second light beam directing means coacting simultaneously to remove and replace by infusion the projected image of one of said optical objects with the projected image of the other optical object and wherein the first and second film gates are positioned transversely of the path of their associated first and second light beams;

the length of the object image transmitting light beams extending between each film gate and said single optical projecting system each defining a fixed length optical axis to thereby provide a predetermined node and a predetermined focal plane in said single projecting system;

the first and second light beam directing means are operably positioned to selectively direct the light of said first and second light beams through said projecting system along said optical axis and said directing means being constructed to define a first and a second light image fold plane for said optical axis;

said first and second light beam directing means being selectively and alternately actuable in said criss-cross directions to maintain the total amount of light employed in the projection of the first and second optical object imgages substantially constant as the projected image of one of said optical objects is removed and replaced by the infusion of the projected image of the other optical object and wherein the light beam directing means is comprised of a first and second support member each operably connected for slidable criss-cross movement with respect to one another along a different one of two planar members between light beam projecting and non projecting positions, said planar members each being operably connected for joint slidable criss-cross movement on a stationary base member, a pin extending from each of said first and second support members, a boss extending from each of said planar members and positioned for separate driving engagement with a different one of said pins to cause said first and second pins and their respective first and second support members to slide in a criss-cross pattern along said planar members in a first direction, between said two positions, separate spring means connected to said stationary base member, each of the pins being positioned for engagement with a separate one of said spring means, each of said spring means providing a biasing force for returning the pin with which it is associated, the boss, the first and second support members and the light directing means in a reverse direction between said two positions and wherein a mechanically movable oscillatable means is employed to move said planar members in opposite directions and in said criss-cross directions along said stationary base member.

4. An optical projector, comprising means for deriving a first and a second light beam from a single light source, each of said light beams having separate axes that extend along a common plane;

a first film gate positioned in the path of said first light beam whereby a first optical object placed in said first film gate is illuminated and the image thereof is transmitted by said first light beam;

a second film gate positioned in the path of said second light beam whereby a second optical object placed in said second film gate is illuminated and the image thereof is transmitted by said second light beam;

a single optical projecting system arranged to project said light;

first and second light beam directing means operably connected for alternate criss-cross movement into a position intermediate said single optical projecting system and said first and second film gates, respectively, for selectively receiving and directing said first and second object image transmitting light beams through said single projecting system;

said optical projecting system and said first and second light beam directing means coacting simultaneously to remove and replace by infusion the projected image of one of said optical objects with the projected image of the other optical object and wherein the first and second film gates are positioned transversely of the path of their associated first and second light beams;

the length of the object image transmitting light beams extending between each film gate and said single optical projecting system each defining a fixed length optical axis to thereby provide a predetermined node and a predetermined focal plane in said single projecting system;

the first and second light beam directing means are operably positioned to selectively direct the light of said first and second light beams through said projecting system along said optical axis and said directing means being constructed to define a first and a second light image fold plane for said optical axis;

said first and second light beam dircting means being selectively and alternately actuatable in said criss-cross directions to maintain the total amount of light employed in the projection of the first and second optical object images substantially constant as the projected image of one of said optical objects is removed and replaced by the infusion of the projected image of the other optical object and wherein the light beam directing means is comprised of a first and second support member each operably connected for slidable criss-cross movement with respect to one another along a different one of two planar members between light beam projecting and non projecting positions, said planar members each being operably connected for joint slidable criss-cross movement on a stationary base member, a pin extending from each of said first and second support members, a boss extending from each of said planar members and positioned for separate driving engagement with a different one of said pins to cause said first and second pins and their respective first and second support members to slide in a criss-cross pattern along said planar members in a first direction between said two positions, two separate spring means connected to said stationary base member, each of the pins being positioned for engagement with a separate one of said spring means, each of said spring means providing a biasing force for returning the pin with which it is associated, the boss, the first and second support members and the light directing means in a reverse direction between said two positions and wherein a solenoid actuated plate in the shape of an equilateral triangle is operably connected to the planar members to introduce said back and forth criss-cross motion thereto.

5. An optical projector, comprising means for providing a first and a second light beam, each of said light beams having separate axes that extend along a common plane, a first film gate positioned in the path of said first light beam whereby a first optical object placed in said first film gate is illuminated by said first light beam;

a second film gate positioned in the path of said second light beam whereby a second optical object placed in said second film gate is illuminated by said second light beam;

an optical projecting system; and first and second light beam directing means positioned intermediate said projecting system and said first and second film gates, respectively, for selectively directing said first and second beams through a projecting system, said first and second light beam directing means being comprised of two light reflecting members, a mechanical means operable when actuated in one direction to simultaneously move the two light reflecting members in one direction along a horizontal plane and a third light reflecting member along a first axis from a non light beam transmitting position to a light beam transmitting position with respect to a first one of the two light reflecting members and while a fourth light reflecting member is moved along a second axis away from light beam transmitting to a non-light beam transmitting position with respect to a second one of the two light reflective members, said mechanical means being further operable to effect a reverse movement of said two light reflecting members and the third and fourth light reflecting members when the mechanical means is moved in an opposite direction and said optical projecting system and said four reflecting members of said first and second light beam direction means thereby coacting simultaneously to remove and replace by infusion the projected image of one of said optical objects with the projected image of the other optical object.

* * * * *